US008805135B2

(12) United States Patent
Lee et al.

(10) Patent No.: US 8,805,135 B2
(45) Date of Patent: Aug. 12, 2014

(54) PRACTICAL SILICON PHOTONIC MULTI-FUNCTION INTEGRATED-OPTIC CHIP FOR FIBER SENSOR APPLICATIONS

(71) Applicants: National Applied Research Laboratories, Taipei (TW); National Tsing Hua University, Hsinchu (TW)

(72) Inventors: Ming-Chang Lee, Hsinchu (TW); Ren-Young Liu, Hsinchu (TW)

(73) Assignee: National Applied Research Laboratories (TW)

( * ) Notice: Subject to any disclaimer, the term of this patent is extended or adjusted under 35 U.S.C. 154(b) by 0 days.

(21) Appl. No.: 13/941,065

(22) Filed: Jul. 12, 2013

(65) Prior Publication Data

US 2014/0023311 A1 Jan. 23, 2014

Related U.S. Application Data

(62) Division of application No. 13/191,954, filed on Jul. 27, 2011, now Pat. No. 8,744,222.

(51) Int. Cl.
*G02B 6/27* (2006.01)
*G02B 6/26* (2006.01)
*G02B 6/28* (2006.01)
*G02B 6/10* (2006.01)

(52) U.S. Cl.
CPC ............... *G02B 6/26* (2013.01); *G02B 6/2813* (2013.01); *G02B 6/105* (2013.01)
USPC ............................................................ 385/28

(58) Field of Classification Search
USPC ........................................................ 385/28
See application file for complete search history.

(56) References Cited

U.S. PATENT DOCUMENTS

| 5,154,917 A | 10/1992 | Ibrahim et al. |
| 5,223,911 A | 6/1993 | Suchoski, Jr. et al. |
| 2008/0024786 A1 | 1/2008 | Sanders |

FOREIGN PATENT DOCUMENTS

WO 2004008207 1/2004

OTHER PUBLICATIONS

Bergh et al., "An Overview of Fiber-Optic Gyroscopes", Journal of Lightwave Technology, Apr. 1984, pp. 91-107, vol. LT-2, No. 2.

(Continued)

*Primary Examiner* — Jerry Rahll
(74) *Attorney, Agent, or Firm* — Volpe and Koenig, P.C.

(57) ABSTRACT

This patent disclosure is based on a silicon, instead of LiNbO$_3$, waveguide chip. The disclosed silicon-based multi-function integrated-optic chip comprises a unique design and fabrication features onto it. A unique polarization-diversity coupler is designed and fabricated to couple the external light into the silicon waveguide structure. A unique two-step (vertical and lateral) taper waveguide region is designed and fabricated to bridge the polarization-diversity coupler output with the input of a multi-mode interferometer (MMI) splitter for power loss reduction. At either end of the Y-junction output, there is a phase modulator to achieve optical phase modulation through various physics mechanisms. With this newly-developed silicon-based multi-function integrated optic chip, the size and cost of fiber sensors including FOG's can be greatly reduced.

9 Claims, 18 Drawing Sheets

(56) References Cited

OTHER PUBLICATIONS

Armenise et al., "Gyroscope technologies for space applications", Optoelectronics Laboratory, Internal Report, ESA ESTEC Iolog Project, Contract DEE-MI, May 2003, pp. 1-26.

Armenise et al., "Modeling and Design of a Novel Miniaturized Integrated Optical Sensor for Gyroscope Systems", Journal of Lightwave Technology, Oct. 2001, pp. 1476-1494, vol. 19, No. 10.

Bergh et al., "An Overview of Fiber-Optic Gyroscopes," Journal of Lightwave Technology (1984) LT-2(2):91-107.

Armenise et al., "Gyroscope technologies for space applications," Optoelectronics laboratory, Internal Report, ESA ESTEC Iolog Project, Contract DEE-MI (May 2003) pp. 1-26.

Armenise et al., "Modeling and Design of a Novel Miniaturized Integrated Optical Sensor for Gyroscope Systems," Journal of Lightwave Technology (2001) 19(10):1476-1494.

PRACTICAL SILICON PHOTONIC MULTI-FUNCTION INTEGRATED-OPTIC CHIP FOR FIBER SENSOR APPLICATIONS

CROSS REFERENCE TO RELATED APPLICATION

This application is a divisional of U.S. patent application Ser. No. 13/191,954, which was filed Jul. 27, 2011, and is incorporated herein by reference as if fully set forth.

FIELD OF THE INVENTION

The invention relates to an optical chip, more particularly this invention is a silicon-based Multi-function Integrated-Optic Chip (MIOC) incorporates a unique polarization diversity coupler, and the two-step taper waveguide designs for single polarization, and low loss sensor applications. The silicon based waveguide is compatible with CMOS (Complementary Metal-Oxide Semiconductor) fabrication process, so integration of optical waveguide with electronic circuit in one chip is feasible that the size and cost of fiber sensors including Fiber-Optic Gyroscopes (FOG's) can be greatly reduced.

BACKGROUND OF THE INVENTION

Microminiaturization plays an increasingly imperative role in our daily life, especially for applications such as positioning, navigation and attitude control. Therefore, there is a need to develop highly integrated, sensitive and miniaturized gyroscopes to be incorporated as rotation sensors for the above mentioned applications.

Among all kinds of approaches in the prior art, FOG's based on Sagnac effect (R. A. Bergh, H. C. Lefevre, H. J. Shaw, "An Overview of Fiber-Optic Gyroscopes", *J. Lightwave Technol.*, vol. 2, n. 2, pp. 91-107, February 1984 and M. N. Armenise, C. Ciminelli, F. De Leonardis, R. Diana, F. Peluso, V. M. N. Passaro, "Micro Gyroscope Technologies for Space Applications", Internal Report, ESA-ESTEC Iolg Project, Contract DEE-MI, May 2003) are extensively used. One of the key components inside a FOG is the photonic chip mastering optical signal processing (M. N. Armenise, V. M. N. Passaro, F. De Leonardis, M. Armenise, "Modeling and Design of a Novel Miniaturized Integrated Optical Sensor for Gyroscope Applications", *J. Lightwave Technology*, vol. 19, n. 10, pp. 1476-1494, 2001. 1).

Prior to the present invention, the traditional fiber sensors such as FOG's employing $LiNbO_3$ as the waveguide material for MIOC had been reported (U.S. Pat. No. 5,223,911). The $LiNbO_3$-based fabrication processes result in a relatively larger and more expensive chip due to smooth waveguide bending requirement, and is not compatible with the mainstream integrated circuit processes.

Other than $LiNbO_3$ MIOC, silicon-based MIOC had also been reported previously (U.S. Pat. No. 5,154,917, and patent application Ser. No. 11/497,020). Comparing to other types of integrated optic waveguides, cost of a silicon-based optical waveguide is relatively low because there is plenty of supply for silicon. Also, within the large operating temperature range, silicon chemical property is benign and stable. No chemical reaction is anticipated. Besides, silicon-based optical waveguides allow large angle splitting and even a 90 degree waveguide bend which greatly reduce the optic chip length from centimeter to millimeter scale, and hence cut down the optic chip cost and sensor dimension. Above all, the silicon waveguide is compatible with CMOS fabrication process, so integration of optical waveguide with electronic circuit in one optic chip is feasible.

However, so far there is no commercially available FOG's claimed on silicon-based MIOC technology due to design deficiencies or process complications. Examples such as for single mode, single polarization operations for sensor applications, U.S. Pat. No. 5,154,917 didn't address the polarizer issue, and Ser. No. 11/497,020 employed a standalone polarizer which inherently increasing the chip length and its associated optical loss.

According to the present invention, applicants have departed from the conventional wisdom, and had conceived and implemented a practical silicon-based MIOC to integrate functions of Y-junction splitter, polarizer, and phase modulators on the single optical chip through the implementation of a unique polarization diversity coupler which is capable of separating TE and TM modes in less than 100 µm length, and the two-step taper waveguide designs for single-mode, and low loss sensor applications such as for miniaturized FOG's. Such integration has additional advantages in reducing the cost of individual component package and perhaps, the effort of alignment. Moreover, through mature IC fabrication technology, the production cost could decrease and the device performance improves. The invention is briefly described as follows.

SUMMARY OF THE INVENTION

Unlike other materials such as silica and lithium niobate, silicon can be utilized to make highly-confined waveguide (silicon photonics wires), dramatically reducing the footprint of the device. Potentially, silicon photonics can monolithically integrate signal-processing circuits on a single chip. In the present invention, we focus on developing a miniaturized fiber optical gyroscope employing a silicon-based MIOC with the features of single-mode, single polarization operation, and small size, low loss and high bandwidth phase modulation. The basic idea is to integrate all optical components, especially the unique polarization diversity coupler and the two-step taper waveguides, on a single silicon chip based on CMOS processes. Trough mature IC fabrication technology, the production cost could decrease and the device performance improves.

The present invention provides an optic chip and fabrication method thereof. The silicon-based integrated photonics chip of the present invention comprises at least a polarization diversity coupler which is designed based on the asymmetry in index of optical refraction. A waveguide is included in the present polarization diversity coupler which can divide an external electromagnetic wave into two components: TE and TM waves, and make one of the TE and TM electromagnetic wave be coupled into the waveguide.

In accordance with one aspect of the present invention, an optic chip is provided. The optic chip includes a two-step taper waveguide bridged the waveguide and a multi-mode interferometer (MMI) splitter. When the polarized electromagnetic wave from the waveguide propagates to the MMI, it can reduce an optical loss and realizes a single-mode propagation.

In accordance with further aspect of the present invention, an optic chip is provided. The optic chip includes a multi-mode interferometer (MMI) splitter connected to the two-step waveguide and the phase modulator. The MMI has a first plurality of waveguides at the input end and a second plurality of waveguides at the output end. Either waveguides connected to the output ends of MMI can modulate the phase of the electromagnetic wave by controlling the concentration of its free carriers.

From the above descriptions, the present invention also discloses a method for manufacturing an optic chip, including the following steps: (1) a bottom clad layer on a substrate is provided, (2) a polarization diversity coupler having a waveguide and a top clad layer is formed on the bottom clad layer, wherein the polarization diversity coupler is designed according to a first pattern and generates a TE and TM electromagnetic wave from an external electromagnetic wave based on the thickness of the waveguide and the top clad layer, one of the TE and TM electromagnetic waves is coupled into the waveguide while achieving phase matching between the polarized electromagnetic waves, and one of which travels through the waveguide and the other travels through the top clad layer, (3) a two-step taper waveguide is connected with the a polarization diversity coupler, wherein the two-step taper waveguide is designed according to a second pattern, in order to reduce optical loss and remain the single-mode propagation, and (4) a multi-mode interferometer (MMI) is connected with the two-step taper waveguide output, wherein the MMI having a plurality of waveguides at the output and input end is designed according to a third pattern, in order to realize a single-mode propagation.

The present invention provides an optic component and fabrication method thereof. The optic component has a waveguide, being covered by a top clad layer on its top and both sides, and sit on a bottom clad layer, wherein an external electromagnetic wave is divided to a TE and TM electromagnetic wave based on the thicknesses of the waveguide and the top clad layer.

From the above descriptions, the present invention also discloses a method for manufacturing an optic component, including the following steps: (1) a bottom clad layer on a substrate is provided and (2) a waveguide is formed on the bottom clad layer and surrounded by a top clad layer on its top and both sides, wherein the optic component is designed according to a pattern, an external electromagnetic wave is divided to a TE and TM electromagnetic wave based on the thickness of the waveguide and the top clad layer.

The above aspects and advantages of the present invention will become more readily apparent to those ordinarily skilled in the art after reviewing the following detailed descriptions and accompanying drawings, in which:

BRIEF DESCRIPTION OF THE DRAWINGS

FIG. 3b shows that a cross-section of the polarization diversity coupler 300 along the aa' dash-line of FIG. 3a;

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only. It is not intended to be exhaustive or to be limited to the precise form disclosed.

Figure 1:
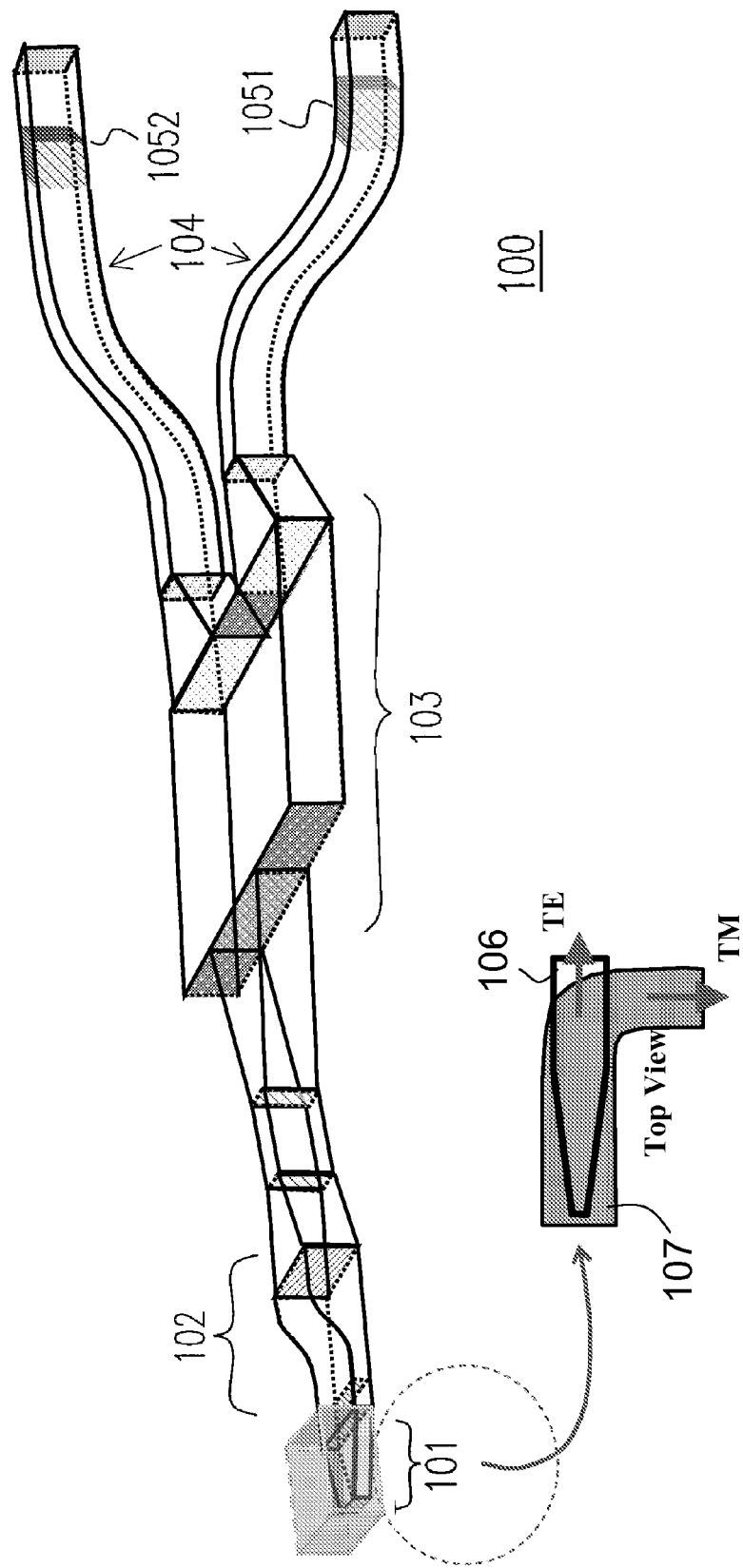
FIG. 1 shows that the provided optical chip, basically formed by the polarization diversity coupler 101, the two-step taper waveguide 102, the multi-mode interferometer (MMI, 103) splitter, the bending waveguides 104, and the phase modulators (1051, 1052), is integrated into a silicon-based MIOC 100, and the illustration (106, 107) shows the top view of the polarization diversity coupler 101.

With the present invention, the provided silicon-based MIOC 100 which can be integrated into FOGs and other fiber sensors is basically formed by the polarization diversity coupler 101, the two-step taper waveguide 102, the multi-mode interferometer (MMI) splitter 103, and the phase modulator 1051 and 1052, as shown in FIG. 1. The following sections describe the provided optic chip in detail.

Figure 2A:
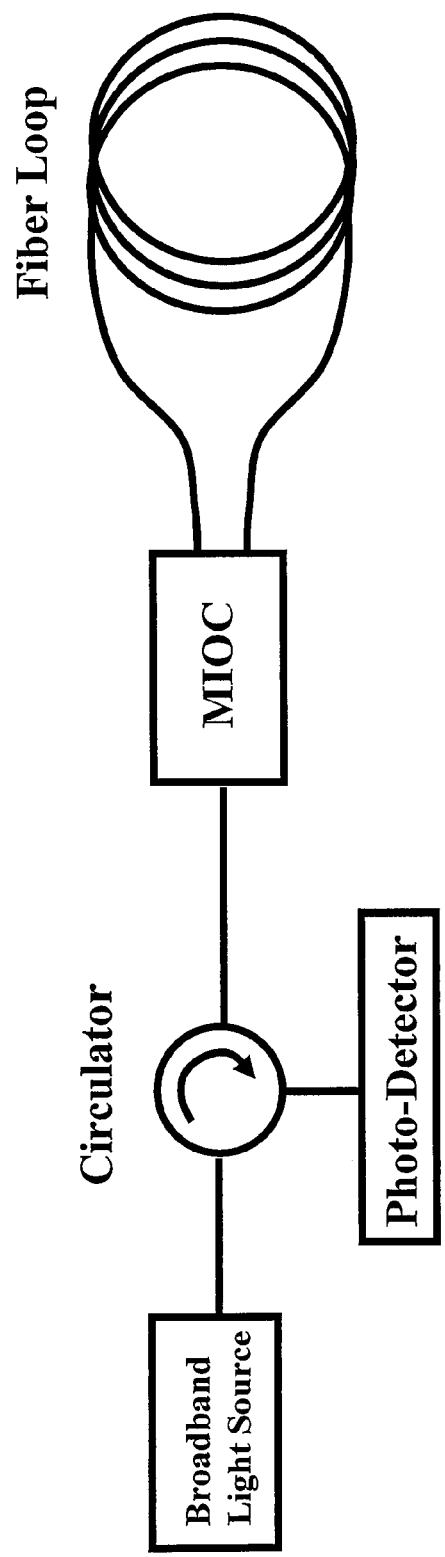
FIG. 2a shows that the FOG configuration integrated with the disclosed silicon-based MIOC.

Please refer to FIG. 2a, which is the FOG configuration integrated with the disclosed silicon-based MIOC. Light is coupled into the fiber sensing loop from a broadband light source via a circulator first, then divided into clockwise and counterclockwise light through the disclosed silicon-based MIOC. Based on the Sagnac effect, the return signals having optical path difference between the two propagating waves due to rotation rate interfered and detected by the photodetector. To suppress the polarization cross-coupling error and maintain reciprocity for the two counter-propagating waves, single-mode, single polarization operation is needed. In addition, phase modulation to the two propagating waves is needed to resolve the rotation polarity, increase the detection sensitivity, and widen the rate input dynamic range.

Figure 2B:
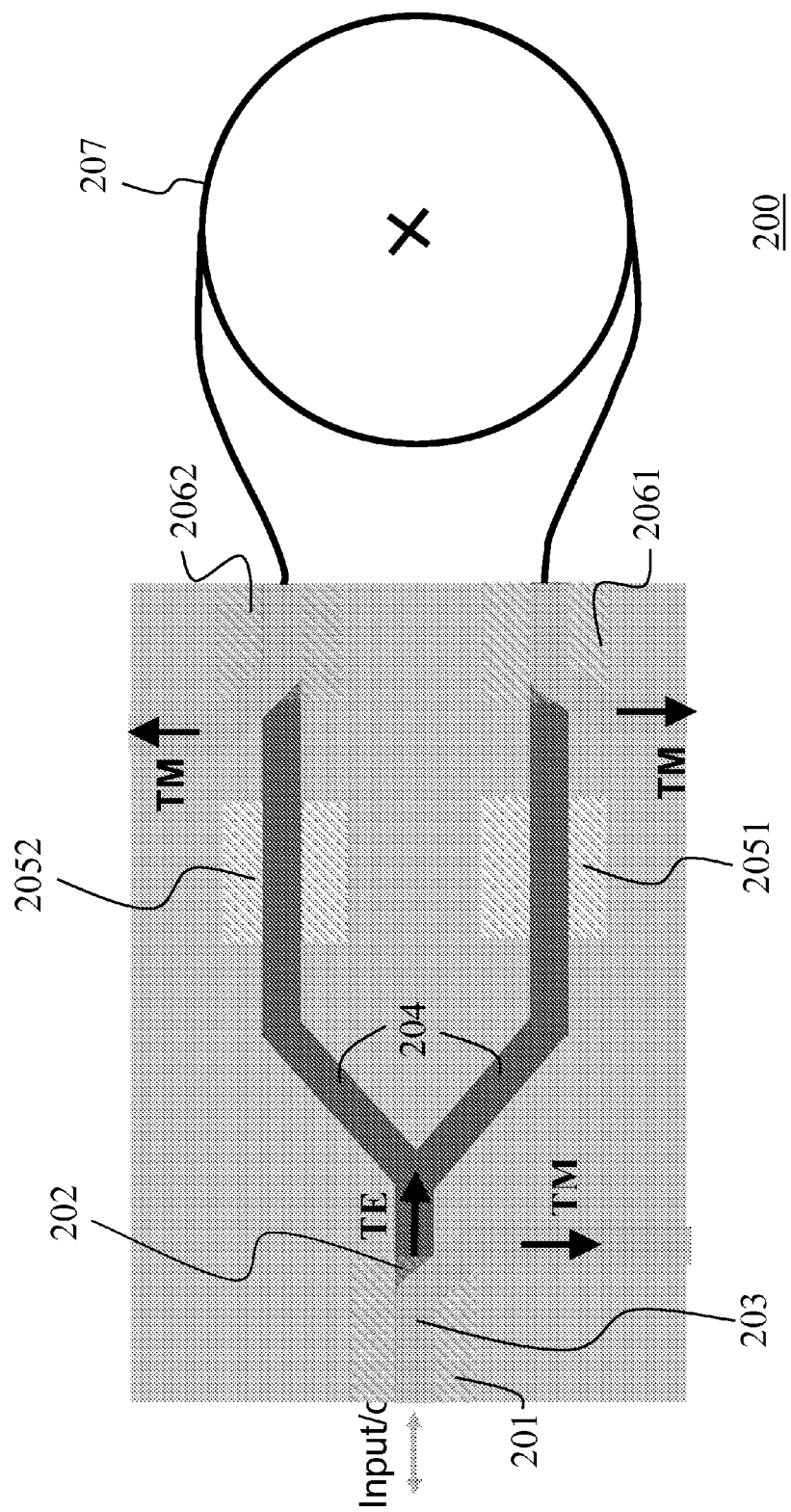
FIG. 2b shows that the functional layout schematics of the silicon-based MIOC with its two outputs connected to a fiber sensing coil.

Please refer to FIG. 2b, which is the system schematics of silicon-based MIOC 200 applied to the optical gyro. The polarization diversity coupler 201 divides an external light into TE and TM waves, in which the TE wave is coupled into the Si waveguide 202 and the TM wave is output along the SiC waveguide 203. The TE wave is transported by the Si waveguide 202, and is then divided into two equal optical signals by Y-junction 204. After that, the divided TE waves will be respectively input to the fiber loop 207 through the two different routes for the further treatment, wherein one of the two routes includes the phase modulator 2051 and the polarization diversity coupler 2061 and the other includes the phase modulator 2052 and the polarization diversity coupler 2062.

Figure 3A:
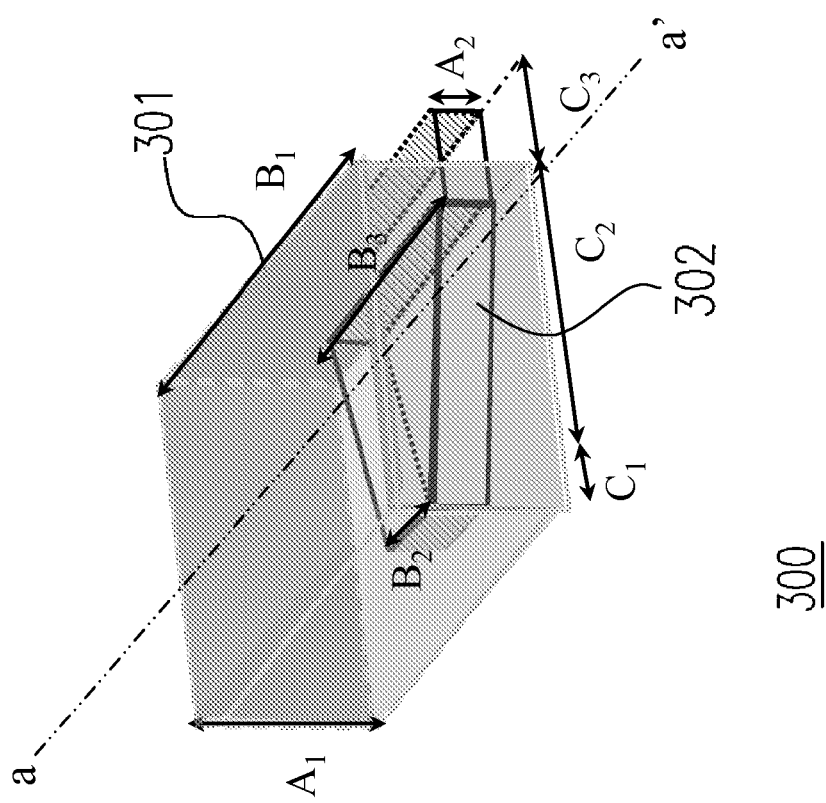
FIG. 3a shows that a 3D perspective drawing of the polarization diversity coupler 300 which is designed based upon the asymmetry in index of optical refraction.

Please refer to FIG. 3a, which is a 3D perspective drawing of the polarization diversity coupler 300 designed based upon the asymmetry in index of optical refraction. The polarization diversity coupler 300, as described in FIG. 3a, consists of a silicon carbide (SiC) guiding layer 301 (top clad layer) with the thickness $A_1=2.5$ μm, the width $B_1=3$ μm and the length $(C_1+C_2)=(25+78)$ μm, wherein $C_2$ (78 μm) is the length of the Si waveguide 302 and $C_1$ (25 μm) is the distance between the tip of the Si waveguide 302 and the side of the SiC top clad layer 301, and a silicon (Si) waveguide 302 having the thickness $A_2=0.13$ μm, the tip width $B_2=0.4$ μm and the wider width $B_3=1.0$ μm which is partly inside and partly outside the SiC top clad layer 301, wherein the outside part has an length $C_3=25$ μm. The thickness of Si waveguide 302 is designed to allow only one TE guided mode confined in the Si waveguide while reject all the TM guided modes.

Figure 3B:
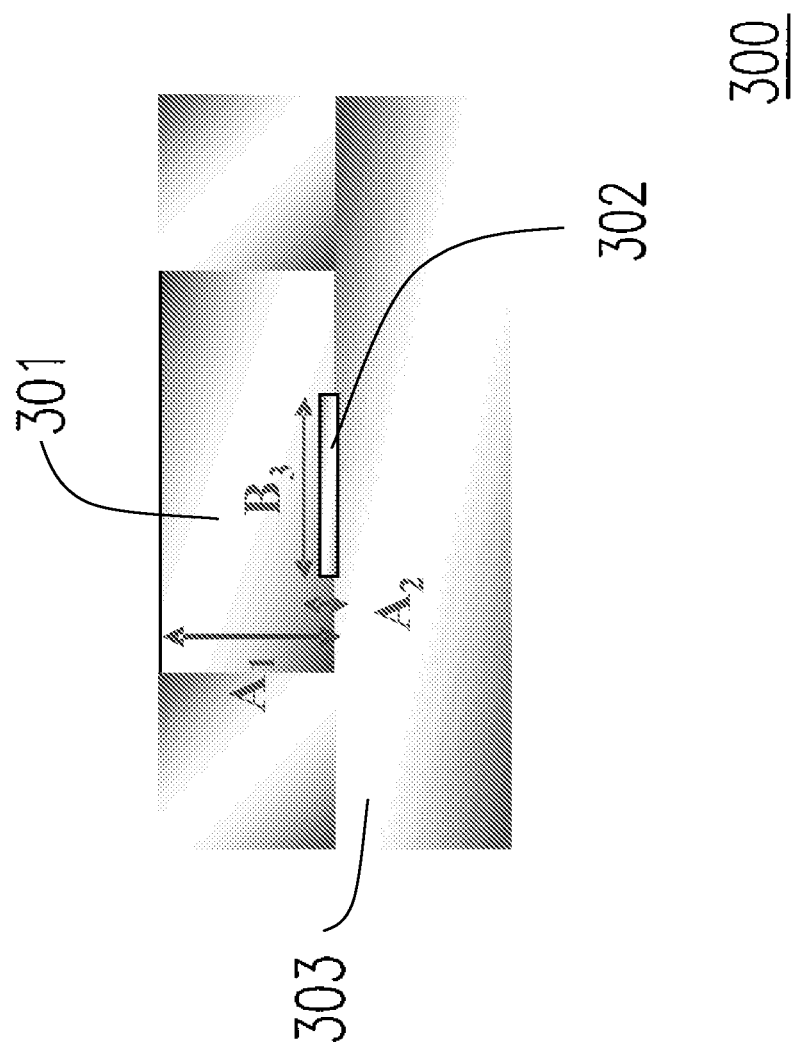

Please refer to FIG. 3b, which is a cross-section of the polarization diversity coupler 300 along the aa' dash-line of FIG. 3a. The Si waveguide 302 is covered by the SiC top clad layer 301, and sit on the silicon dioxide ($SiO_2$) bottom clad layer 303, wherein the thickness $A_1$ of the SiC top clad layer is 2.5 μm, and the thickness $A_2$ of the Si waveguide 302 is 0.13 μm.

Figure 3C:
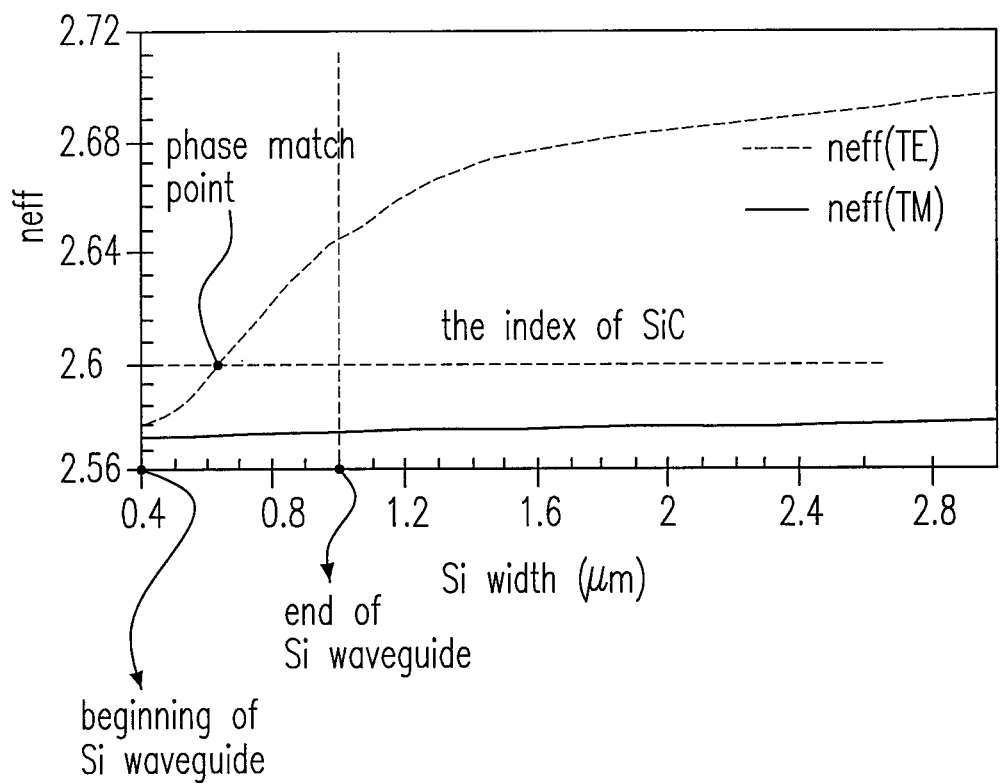
FIG. 3c shows that the FimmWave simulation is used to discover the relation between the width and the effective refractive index of the Si waveguide.
Figure 3D:
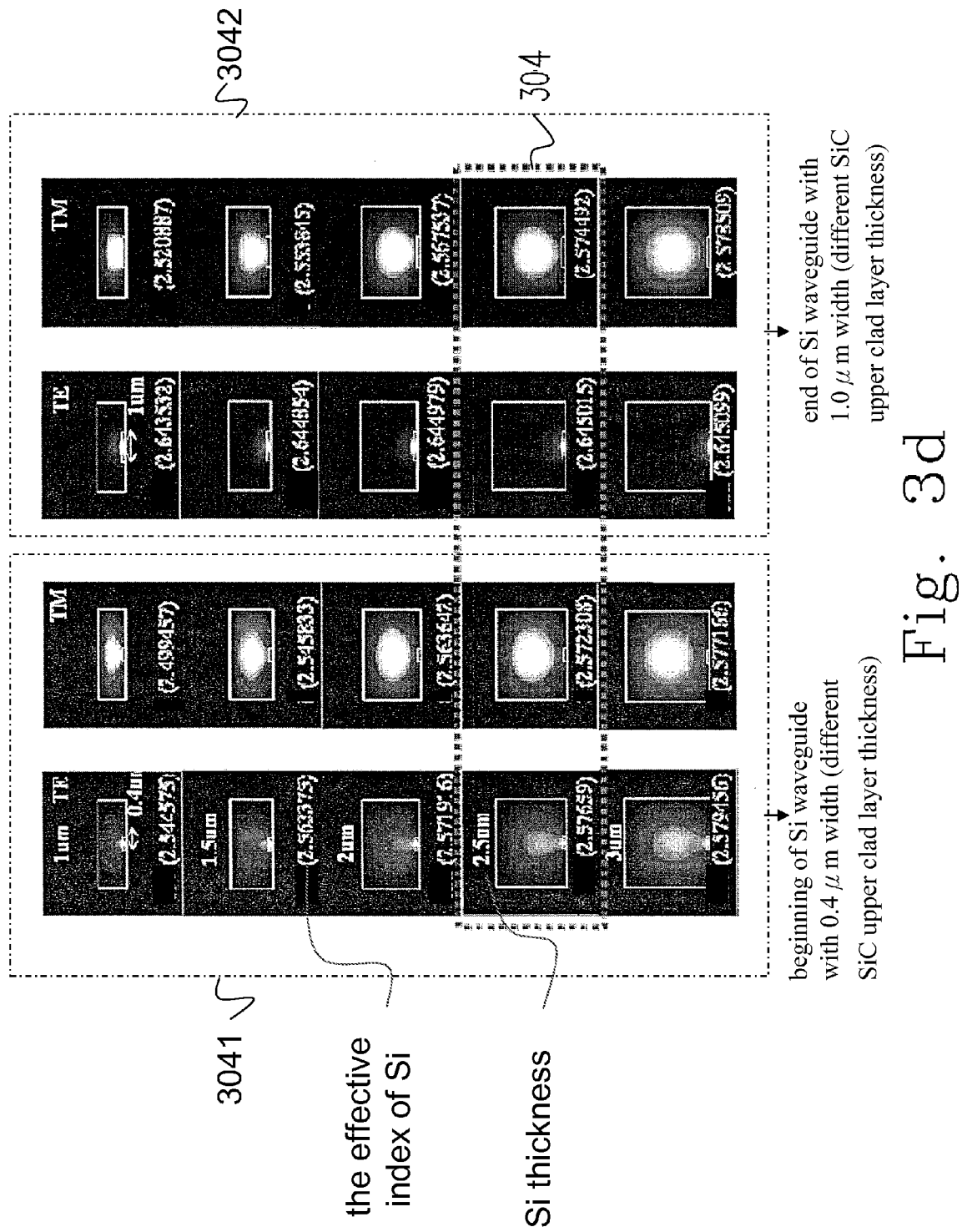
FIG. 3d shows that the FimmWave simulation is used to discover the relation between the thickness of the SiC guiding layer (top clad layer) and the intensities of TE and TM waves.
Figure 3E:
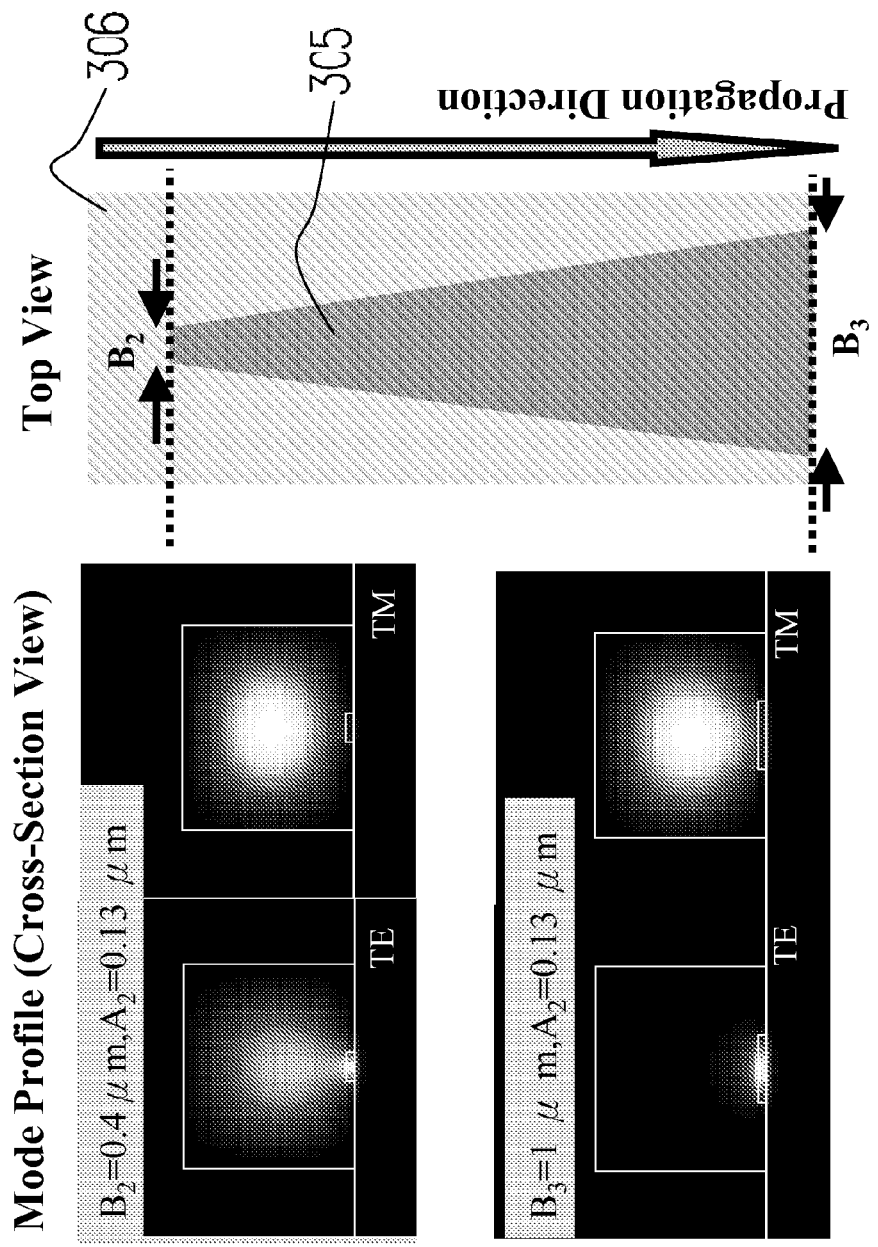
FIG. 3e shows the cross-section (as revealed in FIG. 3b) distribution of the optical field of TE and TM waves along their propagating direction (FIG. 3a, left to right)

Four unique features are conceived and employed to design the polarization diversity coupler 300: (1) The thickness $A_2$ of the Si waveguide 302 is determined by the cutoff condition. The cutoff condition is the maximum thickness which is allowing TE but rejecting TM waves to pass through the Si waveguide. We can separate the TE and TM waves by controlling the thickness $A_2$ of Si waveguide. We calculate the thickness $A_2$ of the Si waveguide 302 for guiding TE wave is between 79 and 150 nm, based on the waveguide theory. In the embodiment, the thickness $A_2$ is set to be 130 nm for the tolerance of fabrication error. (2) The TE wave is to be coupled into the Si waveguide 302, when the phase matching condition is achieved. This means that the effective refractive index of the Si waveguide 302 varies with the width of Si waveguide 302, so the launched TE wave is coupled into the Si waveguide 302 once the effective refractive index of the Si waveguide 302 matches to that of SiC guiding layer 301 (top clad layer). We use the FimmWave simulation software to discover the relation between the width and the effective refractive index of the Si waveguide 302, as shown in FIG. 3c. As you can see, the effective refractive index of the Si waveguide 302 increases while the Si waveguide 302 widens, and is equal to that of the SiC guiding layer 301 (top clad layer) when the width of the Si waveguide 302 is near 650 nm. The widths of Si waveguide 302 are designed to be 0.4 μm and 1 μm representing the beginning and the end of the Si waveguide 302 respectively, to make sure most of the TE wave can be coupled to the Si waveguide 302 within a very short distance $C_2=78$ μm. (3) The TE and TM polarization extinction ratio is determined by the size of the SiC guiding layer 301 (top clad layer). We again use the FimmWave simulation software to discover the relation between the thickness of the SiC guiding layer 301 (top clad layer) and the cross-section field distribution of TE and TM waves inside the Si and SiC waveguides, as shown in FIG. 3d. As you can see from the dashed line frame 304, the thickness of the SiC guiding layer 301 (top clad layer) must be greater than 2.5 μm, or else the part of TM wave will leak into the Si waveguide 302, wherein the dash-line frames 3041 and 3042 represent the cross-section field distribution at the beginning and the end of the Si waveguide 302 in FIG. 3a, respectively. FIG. 3e summarizes the above description, and reveals the most important feature of the polarization diversity coupler on how TE and TM waves propagating in Si and SiC waveguides respectively. The top view on the right hand side shows a Si taper waveguide. And a rectangular SiC guiding layer (top clad layer) on top of Si waveguide. Within only 78 μm, TE and TM waves are completely separated. (4) In the embodiment, in order to obtain the larger extinction ratio, a 90 degree bend is made in the SiC guiding layer (203 in FIG. 2b) with respect to the direction of the Si waveguide (202 in FIG. 2b) to divert the TM wave to the chip edge. As a result, the extinction ratio of the present optic chip with the polarization diversity coupler 300 can be deduced to 30 dB.

Figure 4:
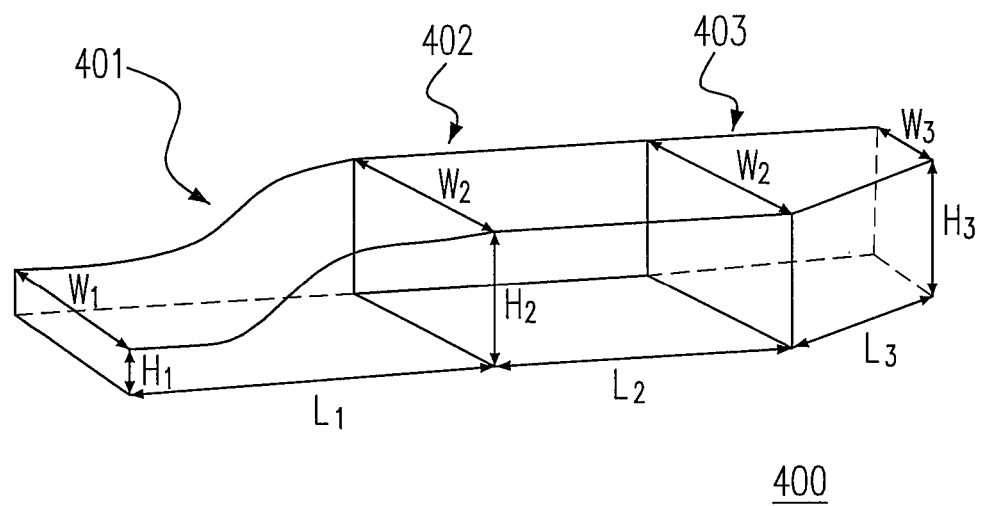
FIG. 4 shows a schematic diagram of the two-step taper waveguide 400 in the present invention.

Please refer to FIG. 4, which shows a schematic diagram of the two-step taper waveguide 400 in the present invention. The two-step taper waveguide 400 is used to bridge the Si waveguide 302 in the polarization diversity coupler 300 (referring to FIG. 3a) and a multi-mode interferometer (MMI) splitter (referring to FIG. 5 of the following paragraph). Preferably, in order to reduce an optical loss and realize a single-mode propagation of the TE wave, the thickness in 401 waveguide section and the width in 403 waveguide section of the two-step taper waveguide 400 need to be increased and decreased, respectively. As a result, a vertical and lateral taper are required and manufactured in the two-step taper waveguide 400. Preferably, the two-step taper waveguide 400 is made of silicon. Based on the above-mentioned and the BMP (Beam Propagation Method) and the FimmProp simulation, we designed a vertical taper 401 with $L_1=2.0$ μm in length, $W_1=1.0$ μm, and a height increases from $H_1=0.13$ μm to $H_2=0.22$ μm, followed by the same cross-section waveguide 402 having the length $L_2=25$ μm, the width $W_2=1.0$ μm and the height $H_2=0.22$ μm, and a lateral taper 403 for single-mode operation having $L_3=20$ μm in length and a width decreases from $W_2=1.0$ μm to $W_3=0.6$ μm.

Figure 5:
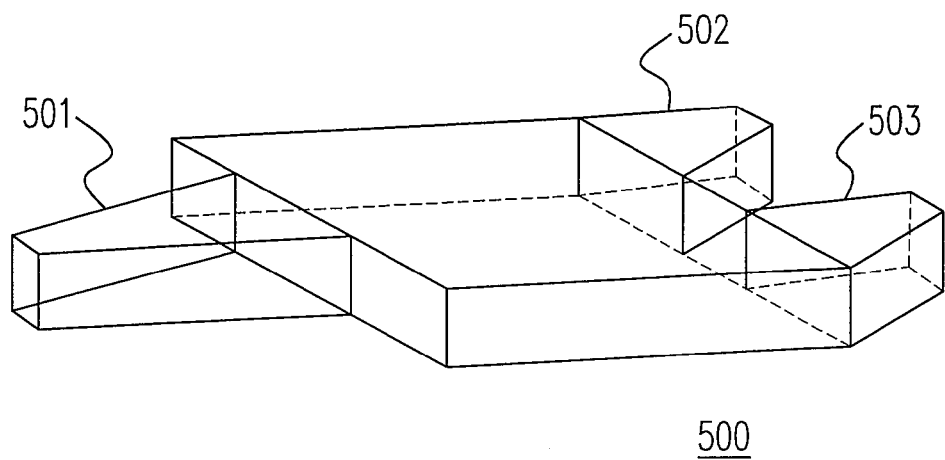
FIG. 5 shows a schematic diagram of a multi-mode interferometer (MMI) splitter 500 introduced for performing light combing and splitting.

Please refer to FIG. 5, which is a schematic diagram of a multi-mode interferometer (MMI) splitter 500 introduced for performing light combing and splitting. Preferably, an input light is split to two lights due to the designed length of the MMI 500. Preferably, in order to reduce an optical reflection and coupling loss, one taper waveguide 501 and two taper waveguides (502, 503) are designed and installed at the input and output end of the MMI 500, respectively. Preferably, the MMI 500 is an one-by-two multimode interference splitters. After a TE wave form the two-step taper waveguide 400 (referring to FIG. 4) emits to the MMI 500, it is split into two TE waves with a 50/50 splitting ratio. In the embodiment, the length and width of the MMI 500, not including 501, 502, and 503, is set as 75 and 9 μm, respectively. Preferably, the splitting loss is less than 0.9 dB based on the result of BMP simulation.

Figure 6:
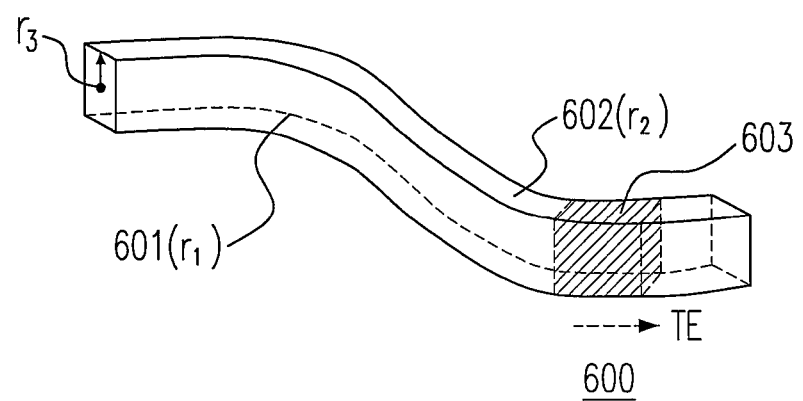
FIG. 6 shows a schematic diagram of a bending waveguide 600 including two bending radius 601, 602, and a phase modulator 603.

Please refer to FIG. 6, which is a schematic diagram of a bending waveguide 600 including the phase modulator 603 corresponding to the phase modulators 1051, 1052 of FIG. 1. In order to reduce the coupling loss, two bending waveguides are introduced to connect with the two output taper waveguides 502, 503 for bridging the MMI 500 (referring to FIG. 5) and the phase modulator. Preferably, the bending waveguide 600 is the Si waveguide with a double bending structure which means that the bending waveguide 600 has an inner 601($r_1$) and an outer 602($r_2$) radiuses of curvature. In the embodiment, an inner 601 and an outer 602 radiuses of curvature are 149.7 μm and 150.3 μm, respectively. Because the radiuses of curvature are big enough and the confinement effect of the Si waveguide is strong, the bending loss will be small when the TE wave propagates in the bending waveguide 600.

Figure 7:
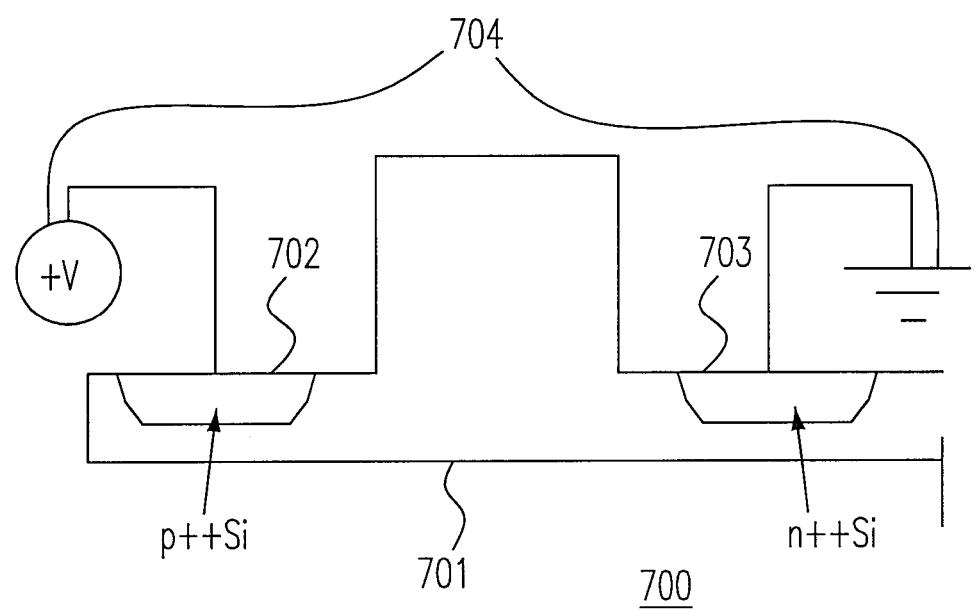
FIG. 7 shows a schematic profile of the phase modulator 700.

Please refer to FIG. 7, which is a schematic profile of the phase modulator 700. The structure of the phase modulator 700 is a rid waveguide 701, and the phase modulator 700 is connected with the bending waveguide 600 (referring to FIG. 6). Therein, the phase modulation is accomplished via the dispersion effect of the free carriers. This means that by controlling the concentration of free carriers in the rid waveguide 701, the phase modulation can be performed. As shown in FIG. 7, the boron (B) ions are doped into the portion on one side of the rid waveguide 701 to form the P-type doping region 702 and the nitrenium (N) ions are doped into the portion on another side of the rid waveguide 701 to form the N-type doping region 703. The refractive index of the rid waveguide 701 can be changed by applying the bias voltage 704 to change the electron hole density in the rid waveguide 701. In the implementation, the rid waveguides 701 is the Si waveguide and its length is 109 µm. The π phase offset can be achieved by applying bias of 1.5 V and the frequency modulation of 20 MHz. In one measurement, the 3 dB bandwidth of the phase modulators was greater than 80 MHz which can be further improved through design and process improvement.

Figure 8:
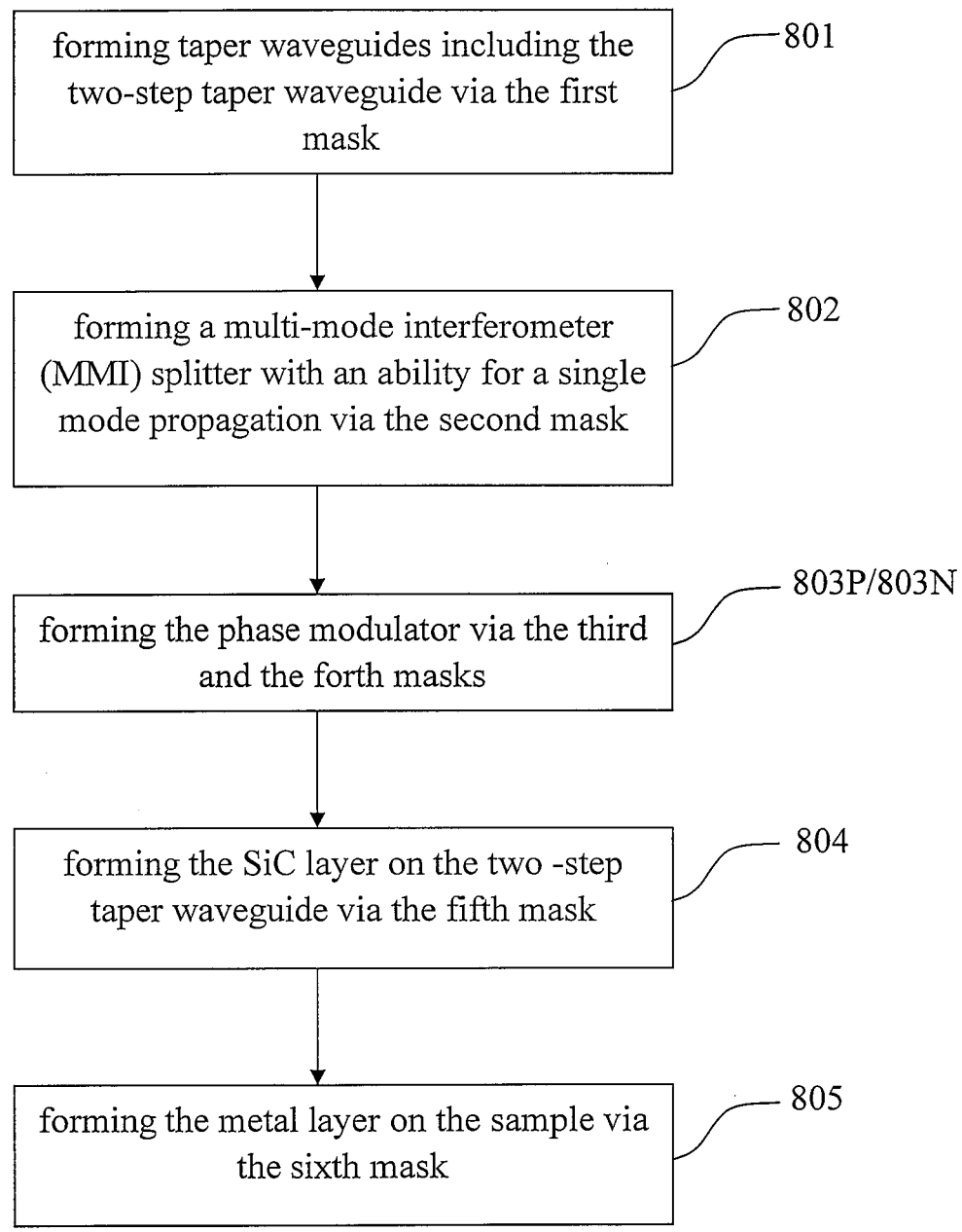
FIGS. 8, including 8(a) to 8(f) show the manufacturing processes of the disclosed Si-based MIOC.
Figure 8A:
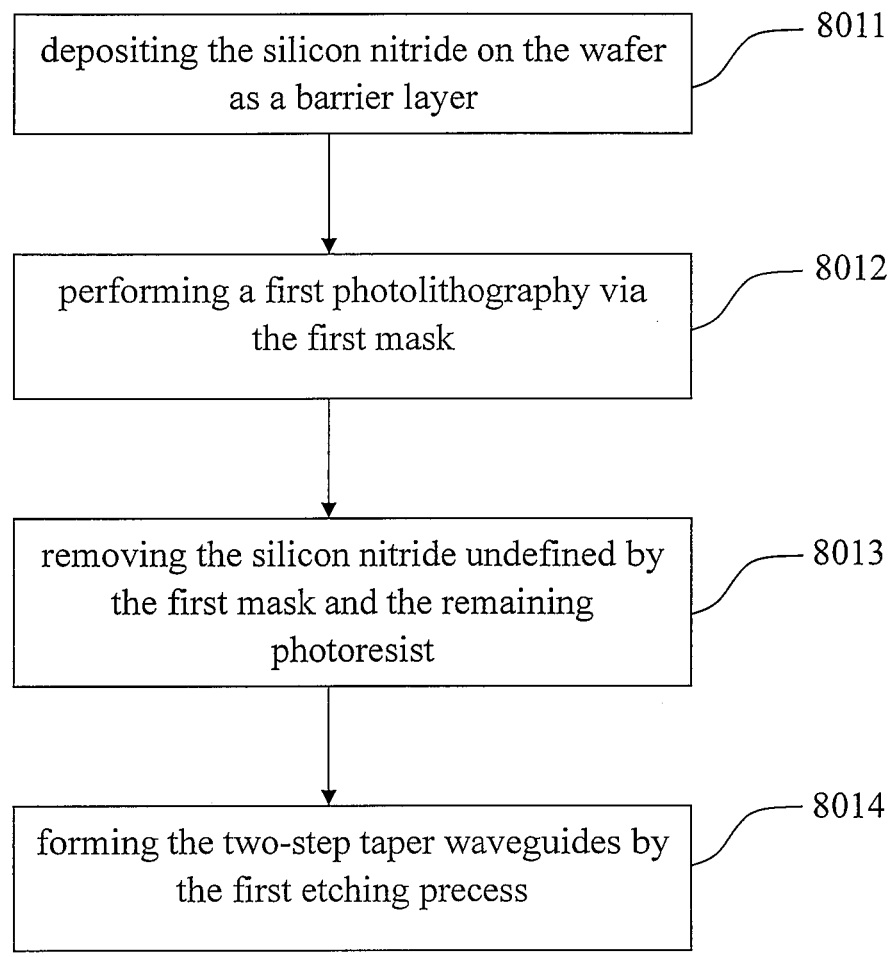

Please refer to FIG. 8, which is a flow chart of the manufacturing process of the present application. The P-type SOI (silicon-on-insulator) wafer is used to manufacture the optical chip 100 (referring to FIG. 1). There are 6 photomaskes, (1) Si mask 801, (2) Waveguide mask 802, (3) P-type doping mask 803P, (4) N-type doping mask 803N, (5) SiC upper clad layer mask 804 and (6) Al metal layer mask 805, have been introduced during the process. For the pretreatment, the thermal oxidation by a Horizontal Furnace and the etching by buffed oxide etch (BOE) are performed in order to thin the thickness of the Si layer of the P-type SOI wafer from 250 µm to 220 µm. The manufacturing process of the present application includes the following steps:

Step 801: Referring to FIG. 8a, it shows the manufacturing steps of Si patterns including the two-step taper transitions. First, the silicon nitride is deposited on the wafer by a furnace as a 100 nm barrier layer 8011. Then, the photoresist is spin-coated onto the silicon nitride layer. After carrying out the soft baking and the hard baking process, an exposure then is performed by irradiating a light beam through the first photomask (801 in FIG. 8). The photoresist layer then is developed to form a first photoresist pattern on the wafer. The above processes are called the photolithography 8012. Then, the sample is etched by reactive-ion-etch (RIE) for 10 seconds to remove the silicon nitride undefined by the first photomask (i.e., the unwanted portion of the first pattern). After that, the dry photoresist stripper (Mattson ASPEN Asher) and SPM ($H_2SO_4$) are used to remove the remaining photoresist 8013. Finally, the TCP-9400 Poly Si Etcher is used to remove 90 nm of Si from the surface. Due to the high etching selectivity between silicon nitride and Si, we can measure the thickness of the surface etch by Surface Profiler.

Figure 8B:
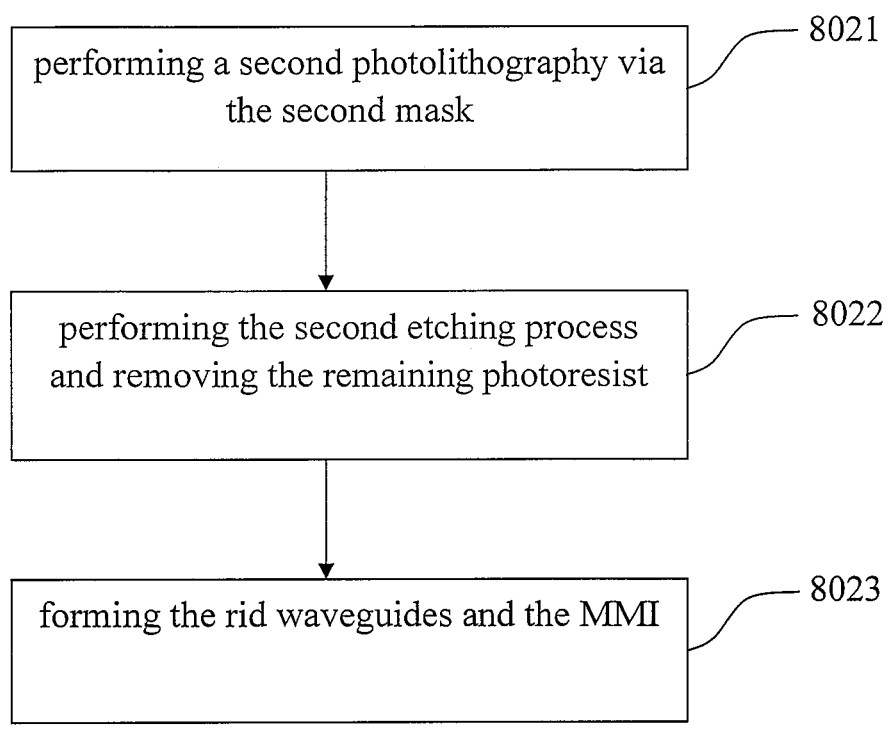

Step 802: Referring to FIG. 8b, it shows the manufacturing steps of waveguides including a multi-mode interferometer (MMI) splitter and rid waveguides, wherein the rid waveguide has ability for single-mode propagation. In this step, the patterns of all rid waveguides are defined by the second photomask and formed by the photolithography 8021. As a result, the pattern of the second photomask (Waveguide mask) will be developed on the SOI wafer. Then, 8022 the TCP-9400 Poly Si Etcher is used to remove 90 nm of Si from the surface. Finally, 8023 the dry photoresist stripper (Mattson ASPEN Asher) and SPM ($H_2SO_4$) are used to remove the remaining photoresist.

Figure 8C:
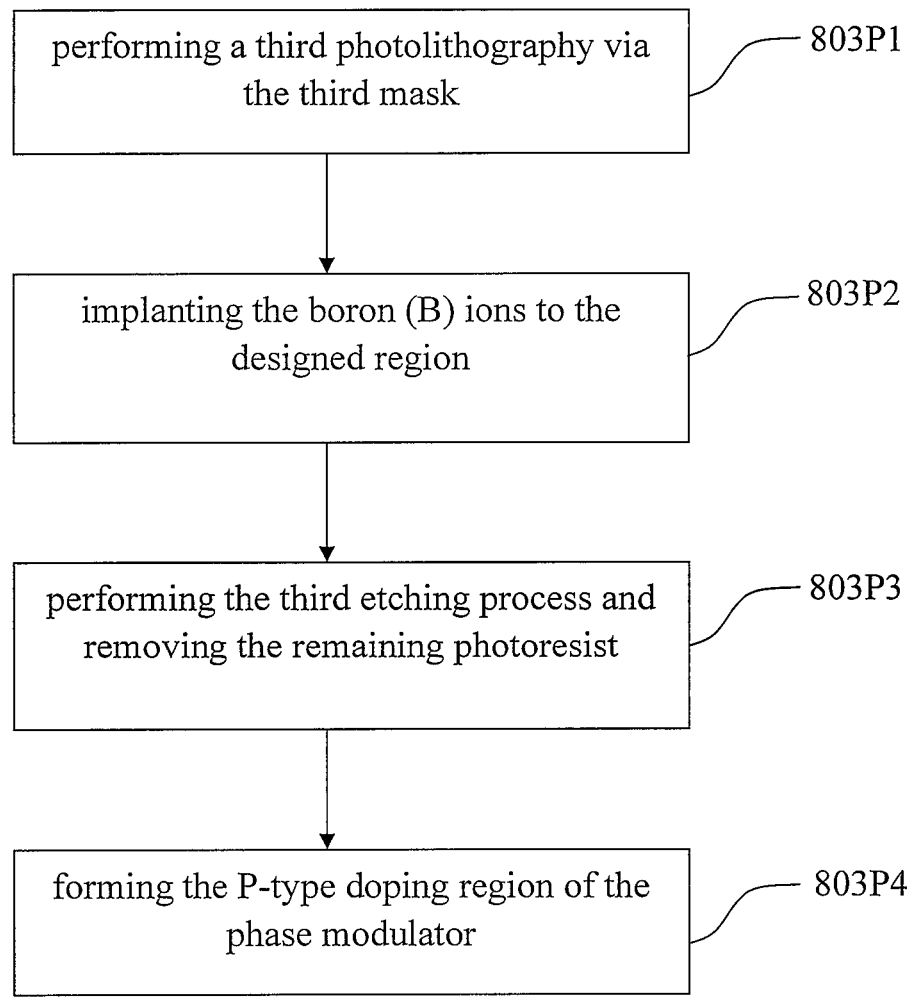

Step 803P: To form the phase modulator having two different type doping regions, two steps are included. For Step 803a: Referring to FIG. 8c, it shows the manufacturing steps of the P-type doping region. The P-type doping region is designed and formed by the photolithography process 803P1. As a result, the pattern of the third photomask (P-type doping mask) will be formed on the SOI wafer. Then, 803P2 the medium current ion implanter (Implantation E500HP) is used to implant the boron (B) ions to form 803P4 the P-type doping region. Finally, 803P3 the dry photoresist stripper (Mattson ASPEN Asher) and SPM ($H_2SO_4$) are used to remove the remaining photoresist.

Figure 8D:
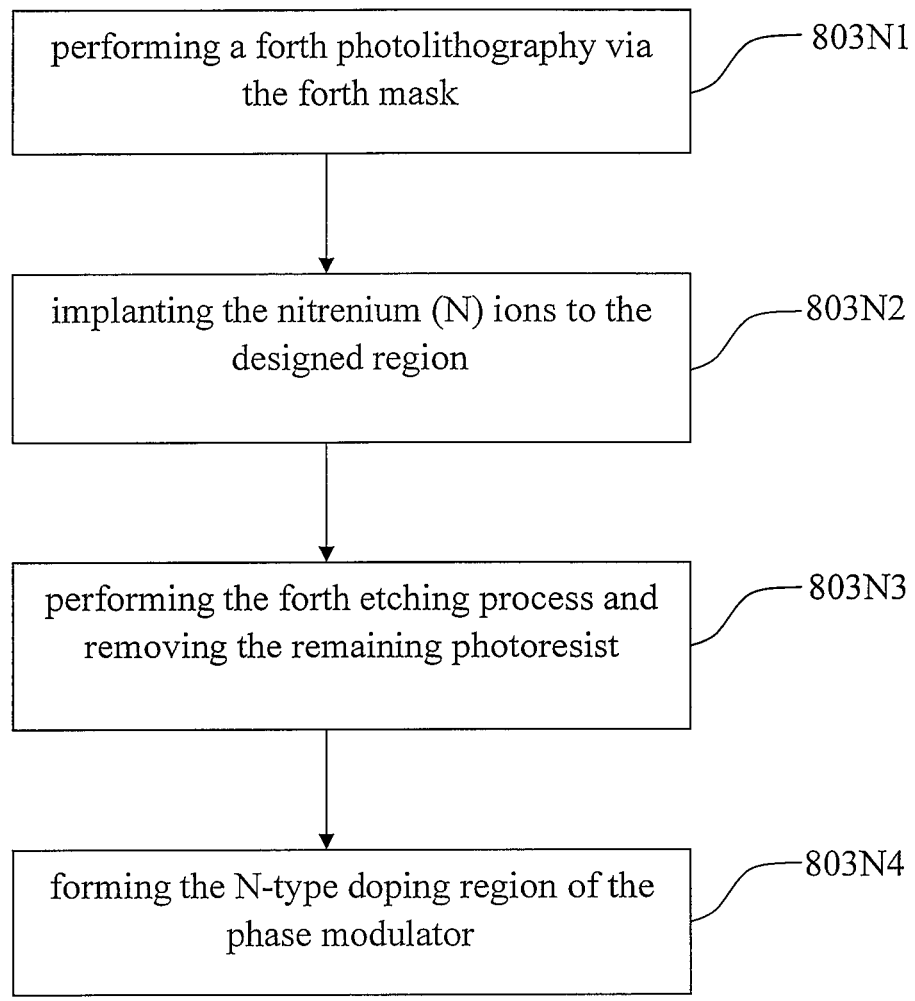

For Step 803N: Referring to FIG. 8d, it shows the manufacturing steps of the N-type doping region. The N-type doping region is designed and formed by the photolithography process 803N1. As a result, the pattern of the fourth photomask (N-type doping mask) will be formed on the SOI wafer. Then, 803N2 the medium current ion implanter (Implantation E500HP) is used to implant the phosphorus (P) ions to form 803N4 the N-type doping region. Finally, 803N3 the dry photoresist stripper (Mattson ASPEN Asher) and SPM ($H_2SO_4$) are used to remove the remaining photoresist.

Figure 8E:
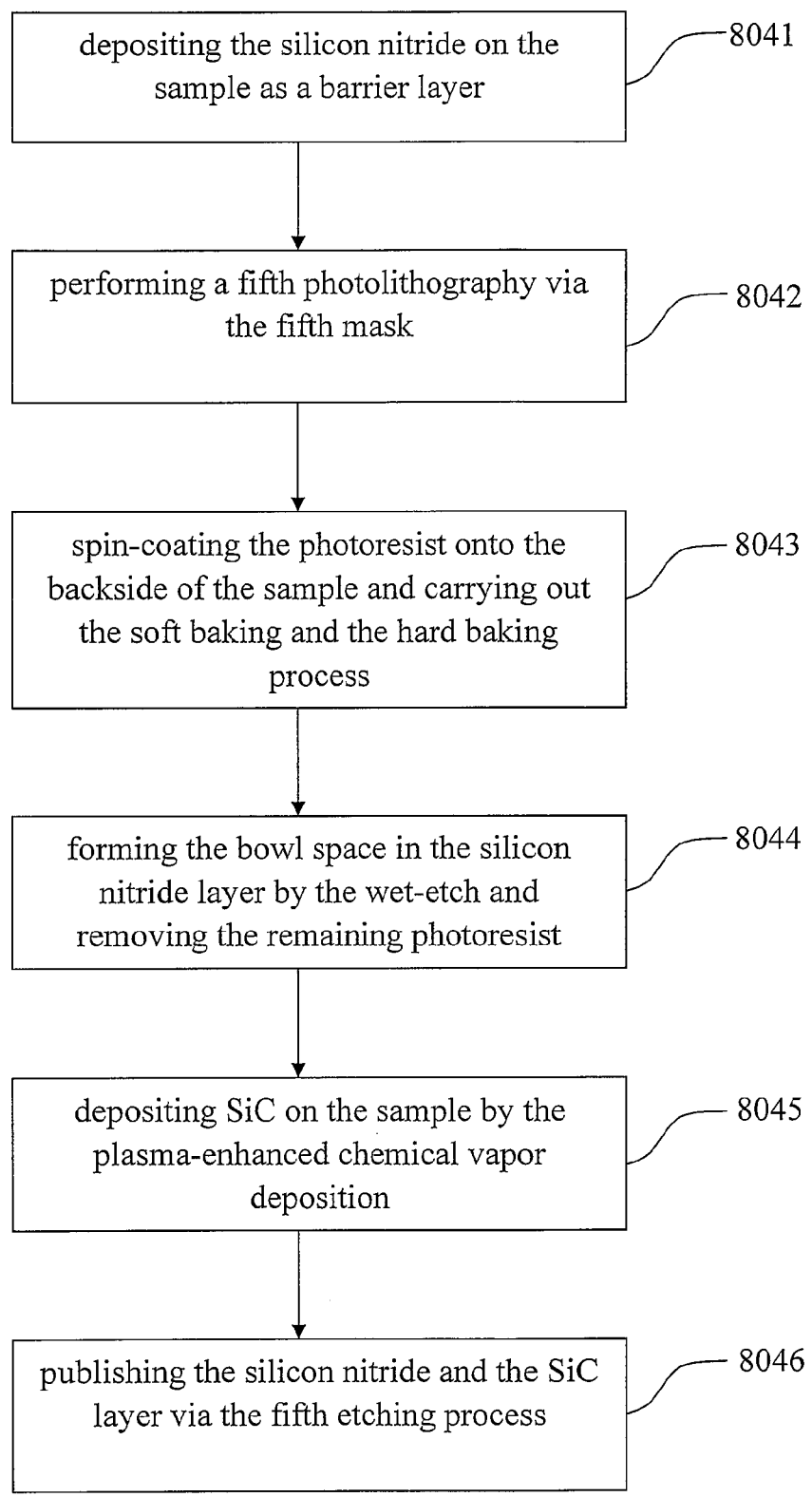

Step 804: Referring to FIG. 8e, it shows the manufacturing steps of the SiC waveguide, the upper clad layer of the Si waveguide, for guiding the unwanted TM wave in the Polarization Diversity Coupler to the chip side edge. For the pretreatment 8041, the silicon dioxide is deposited on the sample by a furnace as a 3 µm barrier layer. Then 8042, the photoresist is spin-coated onto the silicon dioxide layer. After carrying out the soft baking and the hard baking process, an exposure then is performed in the I-line stepper by irradiating a light beam through the fifth photomask (SiC mask). The photoresist layer then is developed in the Track to form a fifth photoresist pattern on the wafer. Then, 8043 the photoresist is spin-coated onto the backside of the SOI wafer. After carrying out the soft baking and the hard baking process again, the sample is wet-etched 8044 by BOE for 340 seconds to remove the silicon dioxide undefined by the fifth photomask (i.e., the unwanted portion of the fifth pattern). Because the anisotropic etching characteristic of the wet-etch, the bowl space will be formed in the silicon dioxide layer. While the over etching happens, the photoresist is removed by the dry photoresist stripper (Mattson ASPEN Asher) and SPM ($H_2SO_4$). Then, 8045 the 7 µm SiC is deposited on the sample by the plasma-enhanced chemical vapor deposition (PECVD). After that, 8046 the SiC is thinned down by the chemical mechanical polishing (CMP) until the designed layer thickness remains.

Figure 8F:
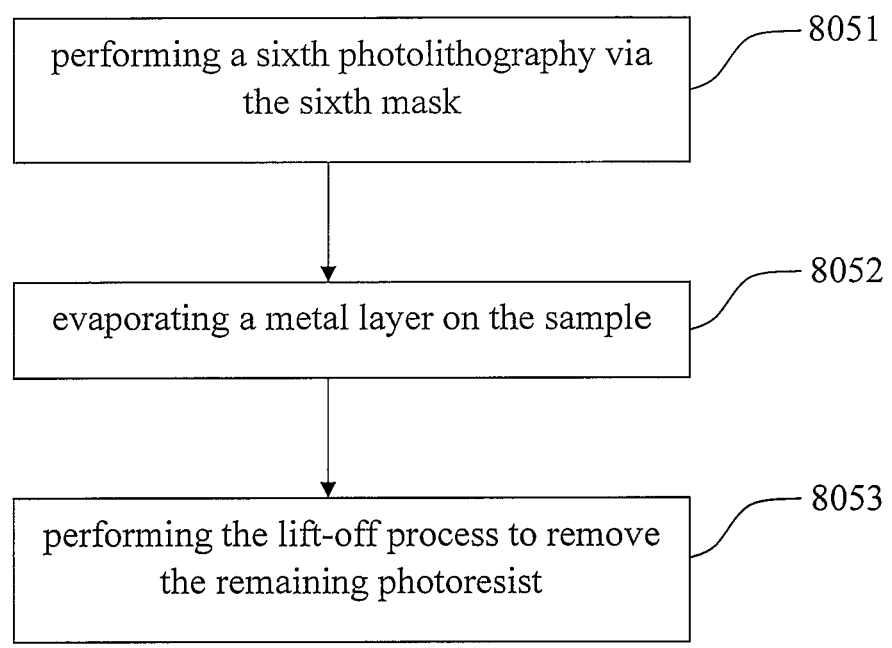

Step 805: Referring to FIG. 8f, it shows the manufacturing steps of evaporating a metal layer on the sample for phase modulators connection. The pattern of the metal layer is designed and formed on the sample by the photolithography process 8051. As a result, the pattern of the sixth photomask (Al mask) will be formed on the wafer. Then, 8052 the 5000 Å Al layer is deposited on the sample by the electron beam gun (E-gun). Finally, 8053 the lift-off process is carried out by the acetone and SPM-2 ($H_2SO_4$) to remove the remaining photoresist and the metal layer.

Based on the above steps, the optical chip which can be integrated into the gyros is completed.

There are still other embodiments, which are described as follows.

Embodiment could be:

1. An optic chip, comprising: a polarization diversity coupler having a waveguide with a first thickness and a width, and a top clad layer with a second thickness which surrounds the top and both sides of waveguide, and generating a TE electromagnetic wave and a TM electromagnetic wave according to an inputted external electromagnetic wave based on the first thickness and the second thickness, wherein one of the TE electromagnetic wave and the TM electromagnetic wave is coupled into the waveguide based on the width of waveguide and the thicknesses of waveguide and top clad layer.

2. An optic chip as claimed in Embodiment 1 further comprising a bottom clad layer, wherein the waveguide, the top clad layer, and the bottom clad layer have a first, a second and a third refractive index respectively, the first refractive index is bigger than the second refractive index, and the second refractive index is bigger than the third refractive index.

3. An optic chip as claimed in Embodiment 2, wherein the waveguide is a guiding layer made from the silicon, the top clad layer is the silicon carbide (SiC), and the bottom clad layer is the silicon dioxide.

4. An optic chip as claimed in Embodiment 1, wherein the waveguide is a taper waveguide.

5. An optic chip as claimed in Embodiment 4, wherein the taper waveguide can guide one of the TE and TM electromagnetic waves to the output side of the polarization diversity coupler.

6. An optic chip as claimed in Embodiment 1, wherein the thicknesses of the waveguide and the top clad layer are obtained by FimmWave simulation or BPM simulation or the other simulation softwares.

7. An optic chip as claimed in Embodiment 1, wherein the top clad layer turns out the optic chip in 90 degree or any other bending angle adequate to reach the edge of the optic chip for outputting the unwanted polarized electromagnetic waves from the polarization diversity coupler.

8. An optic chip as claimed in Embodiment 7, wherein the structure of the clad layers further increases an extinction ratio in the optic chip by preventing the unwanted polarized electromagnetic waves form reflecting back to the polarization diversity coupler.

9. An optic chip as claimed in Embodiment 1 further comprising a multi-mode interferometer (MMI) splitter, and a two-step taper waveguide bridging the waveguide and the MMI.

10. An optic chip as claimed in Embodiment 9, the two-step taper waveguide comprises a vertical taper waveguide and a lateral taper waveguide for reducing an optical loss and realizing single-mode propagation respectively.

11. An optic chip as claimed in Embodiment 9, wherein the two-step taper waveguide is connected with part of the end of the polarization diversity coupler output for receiving the polarized electromagnetic wave from the waveguide.

12. An optic chip as claimed in Embodiment 9, wherein the MMI has a first plurality of waveguides at the input end and a second plurality of waveguides at the output end, and the first and second plurality of waveguides are taper waveguides which reduce the coupling loss.

13. An optic chip as claimed in Embodiment 12, wherein a plurality of bending waveguides is connected with the second plurality of waveguides to increase separation between the two output waveguides for ease of fiber pigtailings at the chip edge.

14. An optic chip as claimed in Embodiment 9, wherein the two-step taper waveguide, the multi-mode interferometer (MMI) splitter and the plurality of bending waveguide are made from the silicon.

15. An optic chip as claimed in Embodiment 14, wherein the plurality of bending waveguides prevents the two output waveguides from coupling to each other.

16. An optic chip as claimed in Embodiment 15, wherein the plurality of bending waveguides is a plurality of rid waveguides.

17. An optic chip as claimed in Embodiment 9, wherein the MMI is an one-by-two multimode interference splitters to divide the polarized electromagnetic wave from the waveguide into a 50/50 splitting ratio output to form a Y-junction.

18. An optic chip as claimed in Embodiment 17, wherein the Y-junction includes two optical branches for propagating the polarized electromagnetic wave.

19. An optic chip as claimed in Embodiment 17, wherein a phase modulator is connected at one side or both sides of the Y-junction output arms to achieve an optical phase modulation.

20. An optic chip as claimed in Embodiment 19, wherein two polarization diversity couplers are connected with two ends of the phase modulator.

21. An optic chip as claimed in Embodiment 19, wherein the optical phase modulation is achieved through one of the following physics mechanisms: a plasma dispersion, an electro-optics, a thermo-optics and a photo-elastic effect.

22. A method for manufacturing an optic chip, comprising: (a) a substrate is provided; (b) forming a two-step taper waveguide on the substrate; and (c) connecting a multi-mode interferometer (MMI) splitter with the two-step taper waveguide, wherein the MMI splitter having an output end comprising at least one taper waveguide or an output end comprising at least two taper waveguides for a single-mode propagation and (d) forming a polarization diversity coupler connected with the two-step taper waveguide, for splitting an electromagnetic wave, having a waveguide with a width and a first thickness, and a top clad layer with a second thickness.

23. A method for manufacturing an optic chip as claimed in Embodiment 22, wherein the electromagnetic wave is split into a TE electromagnetic wave and a TM electromagnetic wave based on the first thickness of the waveguide and the second thickness of the top clad layer, and one of the TE electromagnetic wave and the TM electromagnetic wave is coupled into the waveguide based on the width of the waveguide, and the thicknesses of waveguide and the top clad layer.

24. A method for manufacturing an optic chip as claimed in Embodiment 22, wherein a refractive index of the waveguide is bigger than a refractive index of the top clad layer, and the refractive index of the top clad layer is bigger than a refractive index of the bottom clad layer.

25. A method for manufacturing an optic chip as claimed in Embodiment 22, wherein the waveguide is a taper waveguide.

26. A method for manufacturing an optic chip as claimed in Embodiment 22, wherein the taper waveguide can guide one of the TE and TM electromagnetic waves to the output side of the polarization diversity coupler.

27. A method for manufacturing an optic chip as claimed in Embodiment 22, wherein the substrate and the bottom clad layer is a SOI wafer.

28. A method for manufacturing an optic chip as claimed in Embodiment 22, further comprising in the step (a): (a1) the substrate is treated by a thermal oxide in a furnace; and (a2) a silicon thickness of the SOI wafer is reduced by a wet-etch process using BOE.

29. A method for manufacturing an optic chip as claimed in Embodiment 22, wherein the polarization diversity coupler includes a silicon carbide (SiC) guiding layer as the top clad layer, a silicon (Si) guiding layer as the waveguide and the $SiO_2$ insulator as the bottom clad layer.

30. A method for manufacturing an optic chip as claimed in Embodiment 22, wherein which one of the TE and TM electromagnetic waves being coupled into the waveguide is determined by the width of the waveguide and the thicknesses of waveguide and top clad layer.

31. A method for manufacturing an optic chip as claimed in Embodiment 22, wherein the thicknesses of the waveguide and the top clad layer are obtained by FimmWave simulation or BPM simulation or the other simulation softwares.

32. A method for manufacturing an optic chip as claimed in Embodiment 22, wherein the top clad layer turns out the optic chip in 90 degree or any other bending angle adequate to reach the edge of the optic chip for outputting the unwanted polarized electromagnetic waves from the polarization diversity coupler.

33. A method for manufacturing an optic chip as claimed in Embodiment 22, wherein the structure of the top clad layer further increases an extinction ratio in the optic chip by preventing the unwanted polarized electromagnetic waves form reflecting back to the polarization diversity coupler.

34. A method for manufacturing an optic chip as claimed in Embodiment 22, further comprising in the step (b): (b1) a first photolithography process is performed to form the first pattern, wherein a first photomask is used in the first photolithography process; (b2) a first etching process is performed to reduce the thickness of the waveguide layer to reach a designed first thickness, wherein the first etching process is a dry etching process; and (b3) a first photoresist strip process is performed to remove the remained photoresist in step (b1) by a dry photoresist stripper and a $H_2SO_4$ solution (SPM).

35. A method for manufacturing an optic chip as claimed in Embodiment 22, wherein the two-step taper waveguide is connected with part of the end of the polarization diversity coupler output for receiving the polarized electromagnetic wave from the waveguide.

36. A method for manufacturing an optic chip as claimed in Embodiment 22, wherein the two-step taper waveguide is a vertical and lateral taper waveguide for reducing an optical loss and realizing a single-mode propagation respectively.

38. A method for manufacturing an optic chip as claimed in Embodiment 22, further comprising in the step (c): (c1) a second photolithography process is performed to form the second pattern after depositing a silicon nitride on the substrate as a barrier layer, wherein a second photomask is used in the second photolithography process; (c2) the portion of the silicon nitride area undefined by the second photomask is removed by a reactive ion etch (RIE); (c3) a second photoresist strip process is performed to remove the remained photoresist in step (c1) by a dry photoresist stripper and a $H_2SO_4$ solution (SPM); and (c4) a second etching process is performed to reduce the thickness of the waveguide layer to reach a designed second thickness, wherein the second etching process is a dry etching process.

39. A method for manufacturing an optic chip as claimed in Embodiment 22, wherein the MMI is an one-by-two multi-mode interference to divide the polarized electromagnetic wave from the waveguide into a 50/50 splitting ratio output to form a Y-junction.

40. A method for manufacturing an optic chip as claimed in Embodiment 39, wherein the Y-junction includes two optical branches for propagating the polarized electromagnetic wave.

41. A method for manufacturing an optic chip as claimed in Embodiment 40, wherein a phase modulator is connected at one side or both sides of the Y-junction output arms to achieve an optical phase modulation.

42. A method for manufacturing an optic chip as claimed in Embodiment 41, wherein the optical phase modulation is achieved through one of the following physics mechanisms: a plasma dispersion, an electro-optics, a thermo-optics and a photo-elastic effect.

43. A method for manufacturing an optic chip as claimed in Embodiment 42, wherein the plurality of bending waveguides are a plurality of rid waveguides.

44. A method for manufacturing an optic chip as claimed in Embodiment 43, wherein the two bending waveguides are manufactured in the step (c) of Embodiment 22.

45. A method for manufacturing an optic chip as claimed in Embodiment 22, wherein a plurality of bending waveguides are connected with the plurality of waveguides at the output end of the MMI.

46. A method for manufacturing an optic chip as claimed in Embodiment 22, wherein the plurality of waveguides including a first and a second waveguides at the output and a third waveguide at the input end of the MMI are taper waveguides which reduce an optical reflection and coupling loss.

47. A method for manufacturing an optic chip as claimed in Embodiment 46, wherein the first and second bending waveguides prevent the two output waveguides from coupling to each other.

48. A method for manufacturing an optic chip as claimed in Embodiment 22, wherein the two-step taper waveguide, the multi-mode interferometer (MMI) splitter and the plurality of bending waveguide are made from the silicon.

49. A method for manufacturing an optic chip as claimed in Embodiment 22, further comprising in the step (d): (d1) a third photolithography process is performed to form the third pattern after a silicon nitride is deposited on the substrate as a barrier layer, wherein a third photomask for designing a silicon carbide (SiC) waveguide is used in the third photolithography process; (d2) a third etching process using BOE is performed to remove the portion of the $SiO_2$ layer undefined by the third photomask, wherein the removed portion of the $SiO_2$ layer is a bowl space; (d3) a third photoresist strip process is performed to remove the remained photoresist in step (d1) by a dry photoresist stripper and a $H_2SO_4$ solution (SPM); (d4) the SiC is deposited on the waveguide substrate by a plasma-enhanced chemical vapor deposition (PECVD); and (d5) a polish process is performed to removed the SiC outside the bowl space.

50. A method for manufacturing an optic chip as claimed in Embodiment 22, after step (c), further comprising the steps: (I) a phase modulator is formed on the waveguide substrate for a light modulation, wherein the phase modulator includes a P-type doping and N-type doping region.

51. A method for manufacturing an optic chip as claimed in Embodiment 50, wherein the phase modulation is performed by free carriers.

52. A method for manufacturing an optic chip as claimed in Embodiment 50, further comprising in the step (I): (Ia) a forth photolithography process is performed to form a forth pattern, wherein the forth pattern is designed for P-type doping, and then a photoresist is removed; and (Ib) a fifth photolithography process is performed to form a fifth pattern, wherein the fifth pattern is designed for N-type doping, and then a photoresist is removed.

53. A method for manufacturing an optic chip as claimed in Embodiment 50, wherein a plurality of boron (B) ions and a plurality of nitrenium (N) ions are respectively used to form the P-type doping region and the N-type doping region by a doping process.

54. A method for manufacturing an optic chip as claimed in Embodiment 23 and Embodiment 24, after the step (4), further comprising: (IIa) a sixth photolithography process is performed to form the sixth pattern; (IIb) a forth etching process using BOE is performed to remove the portion of the $SiO_2$ layer undefined by the sixth photomask, wherein the removed portion of the $SiO_2$ layer is a bowl space; (IIc) an evaporation coater is used to evaporate a metal on the substrate to form a metal layer, wherein some of the metal layer is coated on the bottom of the bowl space and the others is coated on the photoresist; and (IId) a lift-off process is performed to remove the photoresist, wherein the metal layer coated on the photoresist is removed along with the photoresist and the metal layer coated on the bottom of the bowl space is remained.

55. A method for manufacturing an optic chip as claimed in Embodiment 54, wherein the evaporation coater is an electron gun system, the metal is an aluminum (Al) and an acetone and a $H_2SO_4$ solution (SPM) are used in the lift-off process.

56. A method for manufacturing an optic chip as claimed in Embodiment 54, wherein the metal layer coated on the bottom of the bowl space is used to conduct the electrons from the N-type doping region and the electron holes from the P-type doping region in order to control the concentration of free carriers in the Si waveguides.

In conclusion, by means of the designed polarization diversity coupler of the optical chip, the external light will be coupled into the waveguide within a very short distance and be split into TE and TM waves. In the optical chip of the present invention, in addition to the single-mode operation, the great extinction ratio is obtained by adding the bending waveguides to the polarization diversity coupler output. Also, a unique two-step (vertical and lateral) taper waveguide region is designed and fabricated to bridge the polarization-diversity coupler output with the input of a multi-mode interferometer (MMI) splitter for power loss reduction. The MMI is to divide the input polarized light into a 50/50 splitting ratio output to form a Y-junction for interfacing splitted light beams with an external sensing element such as a fiber sensing coil for FOG applications. Based on the above description, it is clear that applicants had conceived and implemented a practical silicon-based MIOC to integrate functions of Y-junction splitter, polarizer, and phase modulators on the single optical chip through the implementation of a unique polarization diversity coupler, and the two-step taper waveguide designs for single-mode, single polarization, and low loss sensor applications. Such integration has additional advantages in reducing packaging and alignment cost for discrete components, and above all, Si-based MIOC is relatively small in size and is compatible with CMOS IC processes. It is feasible to foresee the integration of MIOC with the sensor electronics in one single unit.

Based on the above descriptions, it is understood that the present invention is indeed an industrially applicable, novel and obvious one with values in industrial development. While the invention has been described in terms of what are presently considered to be the most practical and preferred embodiments, it is to be understood that the invention should not be limited to the disclosed embodiment. On the contrary, it is intended to cover numerous modifications and variations included within the spirit and scope of the appended claims which are to be accorded with the broadest interpretation so as to encompass all such modifications and variations. Therefore, the above description and illustration should not be taken as limiting the scope of the present invention which is defined by the appended claims.

What is claimed is:

1. An optic component, comprising:
    a waveguide having a width and coupling a polarized light based on the width; and
    a set of asymmetric waveguide refractive indices on which the polarized light, being one of a TE light and a TM light, is generated by dividing an inputted light based on the optic component structure.

2. An optic component as claimed in claim 1 further comprising a top and a bottom clad layers, wherein the waveguide, the top clad layer, and the bottom clad layer have a first, a second and a third refractive index respectively, the first refractive index is bigger than the second refractive index, and the second refractive index is bigger than the third refractive index.

3. An optic component as claimed in claim 1 further comprising an edge, wherein the top clad layer bends to an angle adequate to reach the edge for outputting the unwanted polarized electromagnetic waves.

4. An optic component as claimed in claim 1, wherein the waveguide is a taper waveguide.

5. A method of manufacturing an optic component, comprising:
    forming a waveguide having a width; and
    providing a set of asymmetric waveguide refractive indices, wherein the waveguide couples a polarized light based on the width of the waveguide, and the polarized light is one of a TE light and a TM light generated by dividing an inputted light based on the set of asymmetric waveguide refractive indices.

6. A method of manufacturing an optic component as claimed in claim 5 further comprising steps of:
    providing a bottom clad layer on a substrate on which the waveguide is disposed; and
    covering the waveguide by a top clad layer.

7. A method of manufacturing an optic component as claimed in claim 6, wherein a refractive index of the waveguide is bigger than a refractive index of the top clad layer, and the refractive index of the top clad layer is bigger than a refractive index of the bottom clad layer.

8. A method of manufacturing an optic component as claimed in claim 6, wherein the top clad layer bends to an angle adequate to reach an edge of the optic component for outputting the unwanted polarized electromagnetic waves.

9. A method of manufacturing an optic component as claimed in claim 6, wherein the waveguide is a taper waveguide.

* * * * *